March 6, 1956
M. F. NEFF
2,737,292
PACKING RING SUPPORT
Filed June 27, 1952
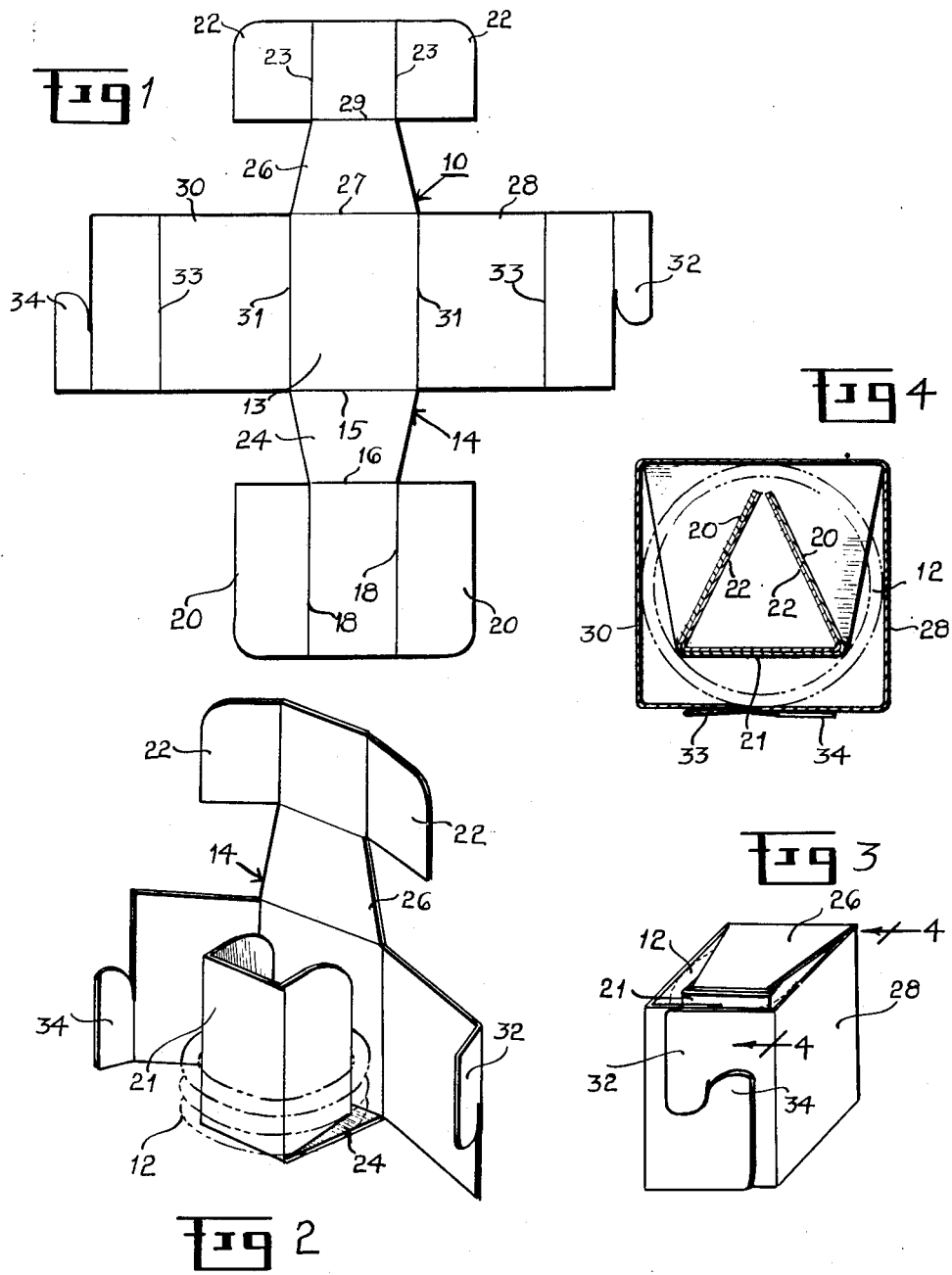
INVENTOR.
Minor F. Neff
BY Henry G. Dybvig
His Attorney

United States Patent Office 2,737,292
Patented Mar. 6, 1956

2,737,292

PACKING RING SUPPORT

Minor F. Neff, Dayton, Ohio, assignor to Precision Rubber Products Corporation, Dayton, Ohio, a corporation of Ohio Application June 27, 1952, Serial No. 295,901

9 Claims. (Cl. 206—65)

This invention relates to a packing ring support and in particular to a one-piece support and enclosure for housing a series of packing rings.

This invention is an improvement over application Serial No. 162,750 of Harold G. Taylor, now Patent No. 2,607,140, issued August 19, 1952, which also relates to a packing ring support. In that application the packing ring support provides a one-piece support which carries the rings and provides a retaining means on each end of a core for holding the rings in place and then terminates in one side enclosing a partial periphery of the rings. In that invention the packing rings are exposed to dust, dirt and other elements.

It is an object of this invention to provide an enclosure for housing the rings to protect them from dust and other exposure elements which might tend to decrease the value of the rings.

It is a further object of this invention to provide a simple and inexpensive housing and support which not only serves to protect the rings against exposure but also provides a means for easily removing one or more of the rings.

It is a further object of this invention to provide a simple and inexpensive support and housing which can carry a particular type and size of ring for a particular application and provide a space on the outside of said housing to indicate such information as the date of cure, chemical composition, size, the name of the manufacturer and the purpose for which the rings are to be used, or any other vital information.

A still further object of this invention is to provide a support which may be made so cheaply that the support may be disposed of when the last of the rings carried has been dispensed therefrom.

Another object is to provide a support that may be stored in a flat "knocked down" condition and readily assembled by the use of interlocking parts without the use of adhesive, staples, or other external fastening means.

Other objects and advantages reside in the construction of parts, the combination thereof and the mode of operation, as will become more apparent from the following description.

In the drawings,

Figure 1 is a plan view of the support laid out in plan.

Figure 2 is a view showing the core bent up in position with rings mounted thereon.

Figure 3 is a view showing the support and enclosure completely assembled.

Figure 4 is a cross sectional view on lines 4—4 of Figure 3.

Referring to the drawings, the reference numeral 10 generally designates a one-piece support enclosure or housing for a series of packing rings 12. The one-piece support housing is generally made from cardboard, but it is obvious that other materials, such as plastic or the like, may be substituted therefor. The support housing or enclosure 10 is made from a single piece of flat cardboard having a main strip 14 provided with transverse crease lines 15, 16, 27 and 29 and bend lines 18 and 23 perpendicular to said crease lines.

The strip 14 is further provided with a central body portion 13 about which the strip is bent to form the support and enclosure. The said main strip is provided with a pair of core forming flanges or flaps 20. These flaps 20 are bent on lines 18, so as to form a triangular core, as best shown in Figure 2. The other end of the main strip is provided with flanges 22 which are bendable along lines 23 to also form a triangular core but inserted within the first mentioned triangular core. Upon first forming the main triangular core with the flaps 20, the rings 12 may be placed thereon and then the other end of the main strip inserted into the main core. The portions 24 and 26 form retaining flanges for holding the rings on the triangular core. The central body portion of the main strip 14 is provided with wrap-around arms 28 and 30 extending perpendicular thereto. The central body portion 13 of the main strip 14 along with the wrap-around arms 28 and 30 encloses the periphery of the rings. These arms are provided with transverse crease lines 31 and 33 to facilitate bending around the rings. The ends of the arms are provided with interlocking flanges 32 and 34 which may be interlocked when extended about the periphery of the rings to complete the housing.

To assemble the support, the portion 24 is bent at right angles to the main body portion 13 along the bend line 15. The end of the main strip is then bent at right angles to the portion 24 about the bend line 16. The flaps 20 are then bent about the lines 18, thereby forming a central hollow core 21, as best shown in Figure 2. The desired number of rings 12 are then placed on the core 21 until it is filled. The portion 26 is then bent about the bend line 27 and the flap portion 22 is bent about the bend line 29. The flaps 22 are then bent about the bend lines 23 and inserted into the core 21 to form a complete loop. The portions 24 and 26 retain the rings on the support of core 21. The wrap-around arms 28 and 30 are then bent about bend lines 31 and 33 to enclose the periphery of the rings 12. The interlocking flanges are then placed into position, so as to make a complete housing for the ring.

The wrap-around arms make a desirable place for labeling the particular size, type and composition of the rings for easy selection thereof. To remove one or two rings as the need may occur, it is only necessary to remove the flaps 22 from the core 21 and slip off the desired number of rings from the core. Then the flaps 22 may be reinserted into the core 21 for holding the remaining rings. When the rings 12 are finally used up, the housing may be disposed of.

By virtue of this invention, a very cheap container is provided that is ideal for shipping the rings from the manufacturer to the ultimate user of the rings. It further provides a very desirable means for storing the rings and protects the rings from possible deterioration. It further provides a simple and efficient means for segregating the different types of rings, so that it is easy to obtain the right size and type whenever a ring is required. This invention further provides a support and housing which may be thrown away after the rings have been entirely used up. The support may be made in various sizes, so as to accommodate various sizes of rings.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth as disclosed and defined in the appended claims.

Having thus described my invention, I claim:

1. In a one-piece enclosure support in combination with a plurality of rings comprising a loop, one portion of which provides a central hollow core and extends upwardly through one end of the rings, another portion of the loop removably extending downwardly into said core through the other end of the rings and partially enclosing the periphery of the rings, means formed integrally with the core and with said other portion extending perpendicular to said core for retaining the rings on the core, the other portion of the loop and core forming a means for removing any desired number of rings from said core, arms extending from said other portion completely enclosing the periphery of said rings, and interlocking means on the ends of said arms for locking the same, said interlocking means on the end of one of said arms engaging the interlocking means on the end of another arm.

2. In a one-piece support in combination with a plurality of rings comprising a central hollow core adapted to pass through said rings, and means including a strap portion adapted to extend along the outer periphery of said rings with the free end of the strap forming a flange portion extending into the interior of the other end of said core downwardly through said rings, and means on said core and strap portion for retaining the rings in place on said core, each side of said strap portion being provided with integral wrap-around portions extending perpendicular thereto, said wrap-around portions enclosing the rings, and means formed on said wrap-around portions for interlocking engagement with each other.

3. In a support in combination with a plurality of rings, a one-piece flexible strip having a plurality of perpendicular arms, each arm provided with a series of transverse crease lines therein for facilitating bending, a first pair of arms of the strip cooperating to form a loop, each of said arms extending into opposite ends of said rings, the said first pair of arms being provided with side flanges bendable along a line perpendicular to said crease line so as to form a central hollow core upon which a series of said rings may be supported, and one side of said loop formation being provided with integral extending arms also having bend lines therein, said arms extending around said core, and a pair of interlocking means on the ends of said arms for completing a housing around the periphery of the rings, said interlocking means engaging each other.

4. In a support for a series of rings comprising a one-piece flexible strip having a series of crease lines therein for facilitating bending the strip into a loop formation, one end of the strip having side flanges bendable along lines perpendicular to said crease lines so as to form a central hollow core on which a series of rings may be supported, the other end of the strip having side flanges bendable along lines perpendicular to said crease lines so as to be inserted in the open end of the hollow core to complete the loop, wrap-around arms extending perpendicular from substantially the central portion of said strip, the said arms also being provided with crease lines transversely thereof so as to enclose the periphery of the rings, and means in the ends of said arms to lockingly engage with each other.

5. In a one-piece support and enclosure in combination with a plurality of packing rings comprising a central body portion, a first pair of arms extending from said body portion each having a pair of flaps thereon, said arms and flaps forming a central hollow core parallel to said body portion, a second pair of arms extending from said body portion enclosing the periphery of said rings and having means on the ends thereof to lockingly engage with each other, said hollow core supporting some of said rings while the other rings are being removed.

6. In a one-piece enclosure support in combination with a plurality of rings comprising a loop, one portion of which provides a central hollow core and extends upwardly through one end of the rings, the other portion of the loop extends downwardly through the other end of the rings and partially encloses the periphery of the rings, said portions providing releasable retaining means for removing some of the rings from said hollow core and still retaining the other ring on said core, and arms extending outwardly from said other portion to completely enclose the periphery of said rings, and means on the ends of said arms to lockingly engage with each other.

7. In a one-piece support and housing in combination with a plurality of packing rings or the like, a central body portion with a plurality of arms extending outwardly therefrom, a first pair of said arms each passing through opposite ends of packing rings so as to provide retaining means for said rings, another pair of said arms cooperating with said main body portion enclosing the periphery of said rings, and interlocking means on each end of said other pair of arms so as to releasably engage each other.

8. In combination with a plurality of rings, a one-piece container, said container comprising a central body portion and a plurality of arms, one pair of said arms extending through opposite ends of said rings so as to form a completed loop, said pair of arms forming a means for removing a portion of said rings while the remaining rings are supported on one of said pair of arms, another pair of arms extending about the periphery of said rings and having means at the ends thereof for releasably locking said other pair of arms.

9. In a container comprising a one-piece flexible strip having a series of crease lines therein for facilitating bending the strip into a loop formation, one end of the strip having side flanges bendable along lines perpendicular to said crease lines so as to form a central hollow core, the other end of the strip having side flanges bendable along lines perpendicular to said crease lines so as to be inserted into the open end of the hollow core to complete the loop, wrap around arms extending perpendicular from substantially the central portion of said strip, the said arms also being provided with crease lines transversely thereof so as to form a complete enclosure, and means in the ends of said arms to lockingly engage with each other.

References Cited in the file of this patent

UNITED STATES PATENTS

| Number | Name | Date |
|---|---|---|
| 1,889,933 | Pratt | Dec. 6, 1932 |
| 1,927,667 | Miller | Sept. 19, 1933 |
| 2,327,156 | Scott | Aug. 17, 1943 |
| 2,607,140 | Taylor | Aug. 19, 1952 |